(12) United States Patent
Oshima (10) Patent No.: US 7,738,243 B2
(45) Date of Patent: Jun. 15, 2010

(54) DISPLAY DEVICE (75) Inventor: Ushio Oshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 756 days.

(21) Appl. No.: 11/717,762

(22) Filed: Mar. 14, 2007

(65) Prior Publication Data

US 2008/0062099 A1    Mar. 13, 2008

Related U.S. Application Data

(63) Continuation of application No. PCT/JP2004/013346, filed on Sep. 14, 2004.

(51) Int. Cl.
    *G06F 1/16* (2006.01)
(52) U.S. Cl. .............. 361/679.21; 40/414; 348/333.06; 206/459.5; 248/393
(58) Field of Classification Search ............ 361/679.22, 361/679.29, 679.07; 40/601, 430, 414, 605, 40/800; 348/836, 115, 333.06, 794; 347/115; 206/736, 315.1, 459.5, 301; 248/419, 425, 248/157, 393
See application file for complete search history.

(56) References Cited

U.S. PATENT DOCUMENTS 6,310,768 B1 * 10/2001 Kung et al. ............ 361/679.29
7,495,897 B2 * 2/2009 Yokawa ................ 361/679.22

2004/0231213 A1 * 11/2004 Ha et al. .................. 40/601

FOREIGN PATENT DOCUMENTS

| JP | 7-93049 | 4/1995 |
|---|---|---|
| JP | 08-185243 | 7/1996 |
| JP | 9-171355 | 6/1997 |
| JP | 10-240140 | 9/1998 |
| JP | 11-007250 | 1/1999 |
| JP | 11-65467 | 3/1999 |
| JP | 11-338363 | 12/1999 |
| JP | 2000-47591 | 2/2000 |

OTHER PUBLICATIONS

International Search Report of International Published Application No. PCT/JP2004/013346 (mailed Oct. 26, 2004).

* cited by examiner

*Primary Examiner*—Hung V Duong
(74) *Attorney, Agent, or Firm*—Staas & Halsey LLP (57) ABSTRACT

A conventional display device is constituted such that, when the display section is rotated to change the orientation thereof, the center of rotation and the center of the display section do not coincide, whereby the rotation operation lacks balance. Hence, the present invention provides a display device comprising a guide mechanism that comprises an annular track that rotates as the display section rotates and a guided member that is fixed to contact the annular track contained in the guide mechanism. By providing the annular track with recesses for fixing the position of the display section when the orientation of the display section is vertical or horizontal, the center of rotation and the center of the display section coincide, and also the screen height following the rotation can be optimized as a result of the rotation operation.

17 Claims, 12 Drawing Sheets

DISPLAY DEVICE

CROSS REFERENCE TO RELATED APPLICATIONS

This application is a continuation of International Application No. PCT/JP2004/13346, filed on Sep. 14, 2004, now pending, herein incorporated by reference.

TECHNICAL FIELD

The present invention relates to a display device and, more particularly, to a display device in which the height of the screen can be varied in conjunction with the rotation of the screen.

BACKGROUND ART

Display devices and, in particular, liquid crystal display devices, are used on many occasions as display devices of PCs (Personal Computers) because they are small, lightweight and offer space savings. Due to the diversity of the application programs that are run on PCs, there are instances where it is appropriate to use the long side of the screen vertically and parallel to the upright direction rather than using the screen, which has a substantially rectangular shape, horizontally. For example, when content on the Internet is viewed by means of a browser, because displaying the browser on a vertical screen reduces the need for vertical screen scrolling on account of the large amount of information displayed at the same time, such a display is easy for the user to use. In addition, so too with document editing, when a vertical document screen is displayed in full screen mode, the vertical screen is easy to see and easy to edit. Accordingly, cases where users employ display devices by frequently changing the vertical or horizontal orientation of the screen in accordance with the application program are also increasing.

Various proposals have been made in the prior art with respect to display devices that allow the orientation of such a screen to be changed. According to Japanese Application Laid Open No. H11-338363, a thin-type display device and a screen vertical and horizontal switching mechanism that simplifies the structure by integrating the rotation mechanism required to change the orientation of the screen and the vertical movement mechanism that adjusts the height of the screen rather than separating these two mechanisms have been proposed. Furthermore, according to Japanese Application Laid Open No. H11-7250, a thin-type display device that allows interference with the floor of the screen when switching between a vertical and horizontal orientation to be prevented and allows the screen position when the screen has an upright orientation to be lowered has been proposed. In addition, according to Japanese Application Laid Open No. H10-240140, a thin-type display device in which the rotational center is designed so that the screen center in the vertical position and the screen center in the horizontal position are different has been proposed. Furthermore, according to Japanese Application Laid Open No. 2000-47591, a display device that comprises an open/close mechanism that moves to open and close a shutter in accordance with the rotation of the display section and in which an air-hole shutter located at the top of the display section is open irrespective of the vertical or horizontal orientation of the display section has been proposed.

However, in the prior art, which relates to a display device that allows the orientation of the screen to be changed, the rotational center does not necessarily match the screen center, the rotation operation lacks balance, and weight is placed on inclined parts. Therefore, wear damage to members which are used as the rotation mechanism and the support mechanism for supporting the screen is sometimes premature. When members wear out due to periods of long usage, in cases where the user removes the hand supporting the rotation operation by mistake, the display device is damaged through contact with the floor or desk as a result of the screen turning by itself due to the eccentricity of the rotational center and the possibility exists that the user will be injured.

Furthermore, in the prior art, there have been instances where the direction of rotation is one preset direction and, when the user applies an excessive force by mistake in the direction in which the screen is unable to rotate, the result has been damage to the rotational mechanism. Thus, the mismatch between the rotational center and screen center and the asymmetry such that rotation is possible in only one direction are not user-friendly and bring about the result of reducing the user convenience of the product.

In addition, when accessories such as operation keys for making adjustments to the speaker or screen are provided on the display device, the accessories have sometimes been moved to positions in which the accessories rotate together with the rotation of the screen and are used when the screen has a vertical or horizontal orientation. Although there are also products that allow accessories to be detached from the screen, there is work required in re-attaching the accessories at suitable points after the orientation of the screen is changed, which is troublesome.

DISCLOSURE OF THE INVENTION

It is therefore an object of the present invention to provide a display device for which the rotational center matches the screen center, which is a display device that places the screen position in a suitable position with respect to the user when the screen is rotated. A display device that does not require re-attachment of the accessories even when the screen is rotated is preferable.

The object according to a first aspect of the present invention is a display device, having a display section in which a substantially rectangular display screen that displays information is provided at the front thereof and a stand that supports the display section, wherein the rear face of the display section comprises an axle portion that protrudes perpendicularly with respect to the display section and one end of which is fixed to the rear face of the display section, and a track that is closed so as to surround the axle portion in the center; the stand is provided such that a linear groove in which the axle portion is inserted is provided in the longitudinal direction and such that an abutment member that abuts the track is provided below the linear groove to protrude perpendicularly with respect to the display section; and the track has cavities in which the distance from the axle portion is short in comparison with another position on the track, in the vertical and horizontal directions of the display section respectively.

According to a preferred embodiment of an aspect of the present invention, the stand comprises a pedestal that contacts amounting surface and a rear face plate connected to the pedestal which extends in a perpendicular direction from the pedestal. Furthermore, in the above embodiment, the display device comprises first and second accessories disposed on the left and right of the display section, wherein the stand comprises a connecting member one end of which is fixed to the rear face plate and into which the first and second accessories are inserted horizontally, the first accessory comprising a first fixed member that protrudes perpendicularly with respect to the display section and abuts the track and the second accessory comprising a second fixed member that protrudes perpendicularly with respect to the display section and abuts the track; and the first and second fixed members may be linked by an elastic member and abut the track from the outside with the track interposed therebetween.

According to a preferred embodiment of an aspect of the present invention, the stand comprises: an attachment member for fixing to a wall surface; and an arm that is connected to the attachment member and for which the angle of attachment to the attachment member is adjustable. Further, according to a preferred embodiment of an aspect of the present invention, the abutment member may be an axle-like member and the track may be formed by a guide groove in which the tip of the axle-like member is inserted.

According to a preferred embodiment of an aspect of the present invention, the track is formed by a protruding member which is provided protrudingly with respect to the stand and covers a predetermined region of the rear face of the display section, centering around the axle portion. According to this embodiment, the abutment member may be a pulley and the protruding member may be a cam. According to a preferred embodiment of an aspect of the present invention, the track is formed by a detachable and deformable member.

According to the present invention, when the orientation of the screen is changed to vertical or horizontal, the user is able to optimally adjust the height of the screen whose orientation has been changed simply by performing a screen rotation operation in which the center of the screen is taken as the rotational center. Thus, the user is able to effect a change in screen orientation and a height adjustment by means of a single operation and the labor of the user in changing the screen orientation is lightened.

Because the rotational center is the center of the screen, the rotational operation can be well balanced and a weighting bias can be prevented. Excess member damage is also prevented.

Further, it is sufficient for the user to rotate the screen to the right or left to change the orientation of the screen and product damage that is induced by limiting the rotation of the screen to the one direction can be prevented. Further, this means a superior design for the user (user-friendly).

In addition, when an operation key or the like for adjusting the speaker or screen is attached to the display device, accessories are disposed in suitable positions on the left and right of the display device irrespective of whether the screen is oriented vertically or horizontally. Thus, the work of re-attaching the accessories by the user is unnecessary even when the orientation of the screen is changed and the labor by the user that accompanies changing the screen orientation is lightened.

BRIEF DESCRIPTION OF THE DRAWINGS

FIG. 1 illustrates the display device of a first embodiment of the present invention.

FIG. 2 illustrates the connective relationship between a display section 10 and a stand 30.

FIG. 4 illustrates an aspect during rotation of the display device of the first embodiment of the present invention.

FIG. 9 illustrates an aspect when the display device of the modified example of the first embodiment is rotated.

FIG. 12 is a rear view when the display is rotated of the second embodiment.

BEST MODE FOR CARRYING OUT THE INVENTION

Embodiments of the present invention will be described hereinbelow with reference to the drawings. However, the technical scope of the present invention is not limited to such embodiments and covers the inventions appearing in the claims as well as any equivalents thereof.

Figure 1A:
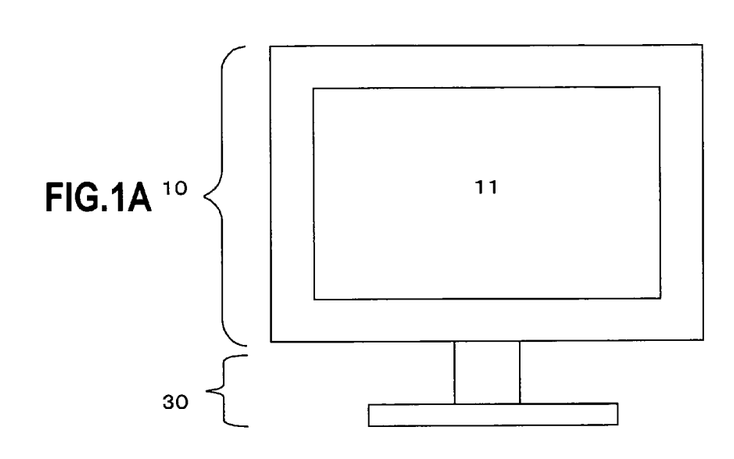
FIG. 1A is a front view of the display device.
Figure 1B:
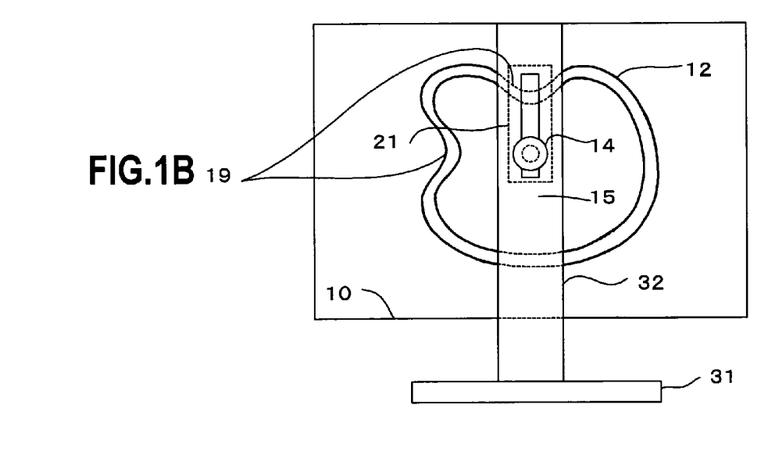
FIG. 1B is a rear view of the display device.
Figure 1C:
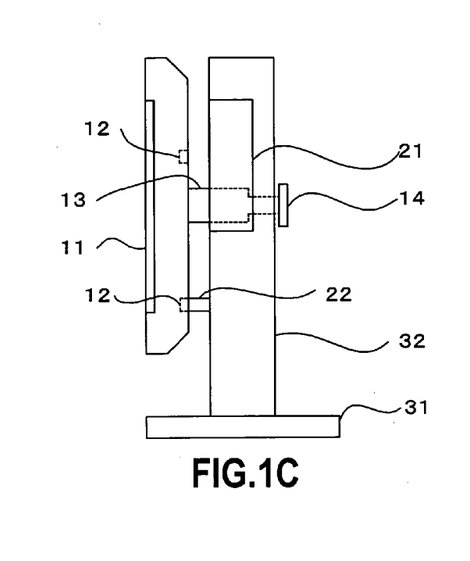
FIG. 1C is a right-sided view of the display device.

FIG. 1 illustrates the display device of the first embodiment of the present invention. FIG. 1A is a front view of the display device; FIG. 1B is a rear view of the display device; and FIG. 1C is a right-sided view of the display device. The display device is constituted by the display section 10 that comprises a monitor 11, which is a substantially rectangular-shaped display screen that displays information, and stand 30 which supports the display section 10.

With reference to FIG. 1B, a cylindrical fixed pin 13 that is perpendicular to the display section 10 is fixed to the display section 10 on the rear face of the display section 10. With reference to FIG. 1C, the fixed pin 13 has a dual-stage structure with a small diameter at a midway point and the tip of the fixed pin 13 penetrates the stand 30 and has abroad fixed member 14 attached thereto. Thus, the display section 10 does not fall forward (left direction in FIG. 1C).

With reference to FIG. 1C, the rear face of the display section 10 comprises a guide groove 12 that is closed around the fixed pin 13. An annular track is also formed by the guide groove 12. Further, cavities 19 are formed in the guide groove 12 closer to the fixed pin 13 than other positions on the annular track.

The stand 30 of the first embodiment comprises a pedestal 31 that is placed on the mount face and a rear face plate 32 that extends vertically from the table 31. The rear face plate 32 has a linear groove 21 in which the fixed pin 13 is inserted formed in a perpendicular direction. The horizontal width of the linear groove 21 is of a size that substantially matches the larger diameter of the fixed pin 13 and the linear groove 21 is unable to sway from left to right. The depth of the linear groove 21 is made to correspond with the position in which the diameter of the fixed pin 13 changes. If we now reference FIG. 1B, a slit 15 penetrated by the fixed pin 13 now with a small diameter is also provided in the rear face of the rear face plate 32 and the horizontal width of the slit 15 is smaller than the horizontal width of the fixed member 14. This serves to prevent the display section from falling.

Another fixed pin 22 that protrudes perpendicularly with respect to the display section 10 below the linear groove 21 is also fixed to the rear face plate 32. This fixed pin 22 is housed within the guide groove 12 of the display section 10. That is, the diameter of the fixed pin 22 has a size that substantially corresponds with the horizontal width of the guide groove.

Figure 2A:
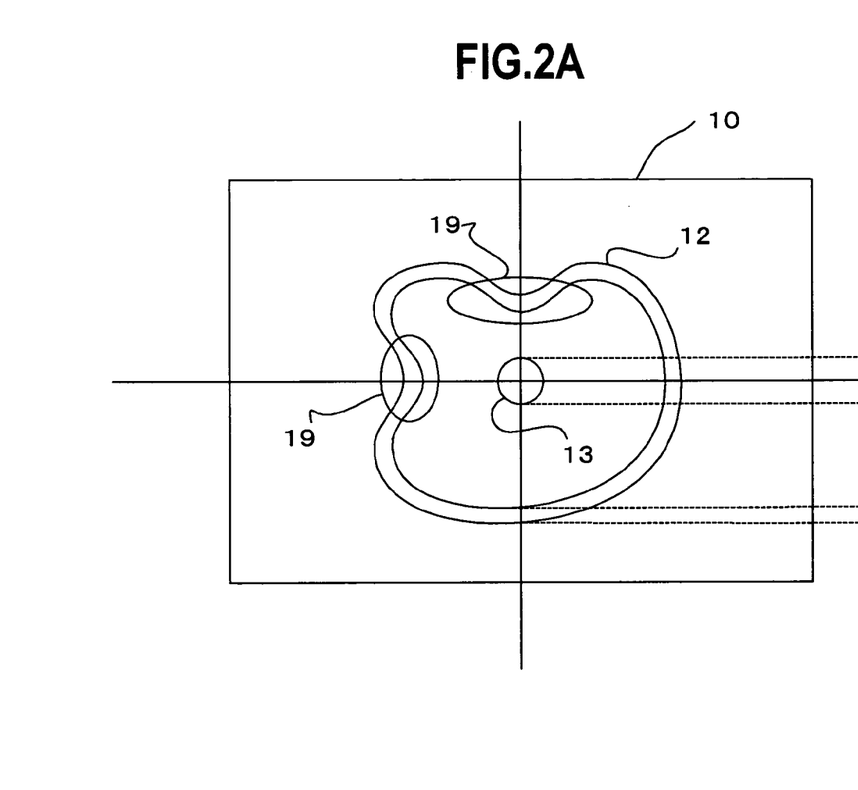
FIG. 2A is a rear view of the display section.
Figure 2B:
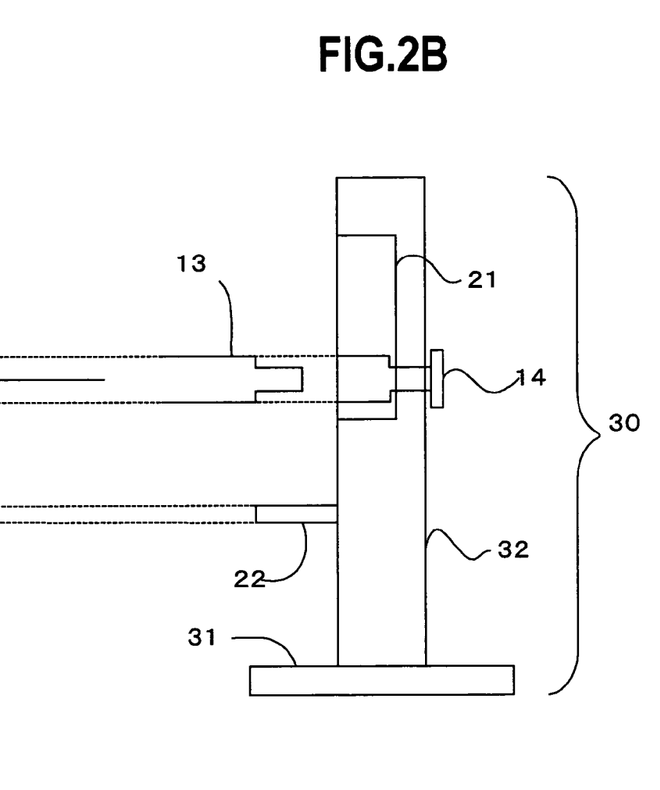
FIG. 2B is a right-sided view of the stand.

FIG. 2 illustrates the connective relationship of the display section 10 and the stand 30. FIG. 2A is a rear view of the display section 10 and FIG. 2B is a right-sided view of the stand 30. The cavities 19 of the guide groove 12 pass through the center of the display section 10 and are formed on two linear extensions which are parallel to the short and long sides of the display section 10. In FIG. 2, one cavity 19 is disposed in the vertical and horizontal directions of the display section 10, respectively. However, cavities may also be disposed in laterally symmetrical positions and a total of four cavities may be present.

As shown in FIG. 2, the stand 30 supports the display section 10 as a result of the fixed pin 13 being supported at the lower end of the linear groove 21 and the fixed pin 22 being inserted in the guide groove 12.

Figures 3A, 3B:
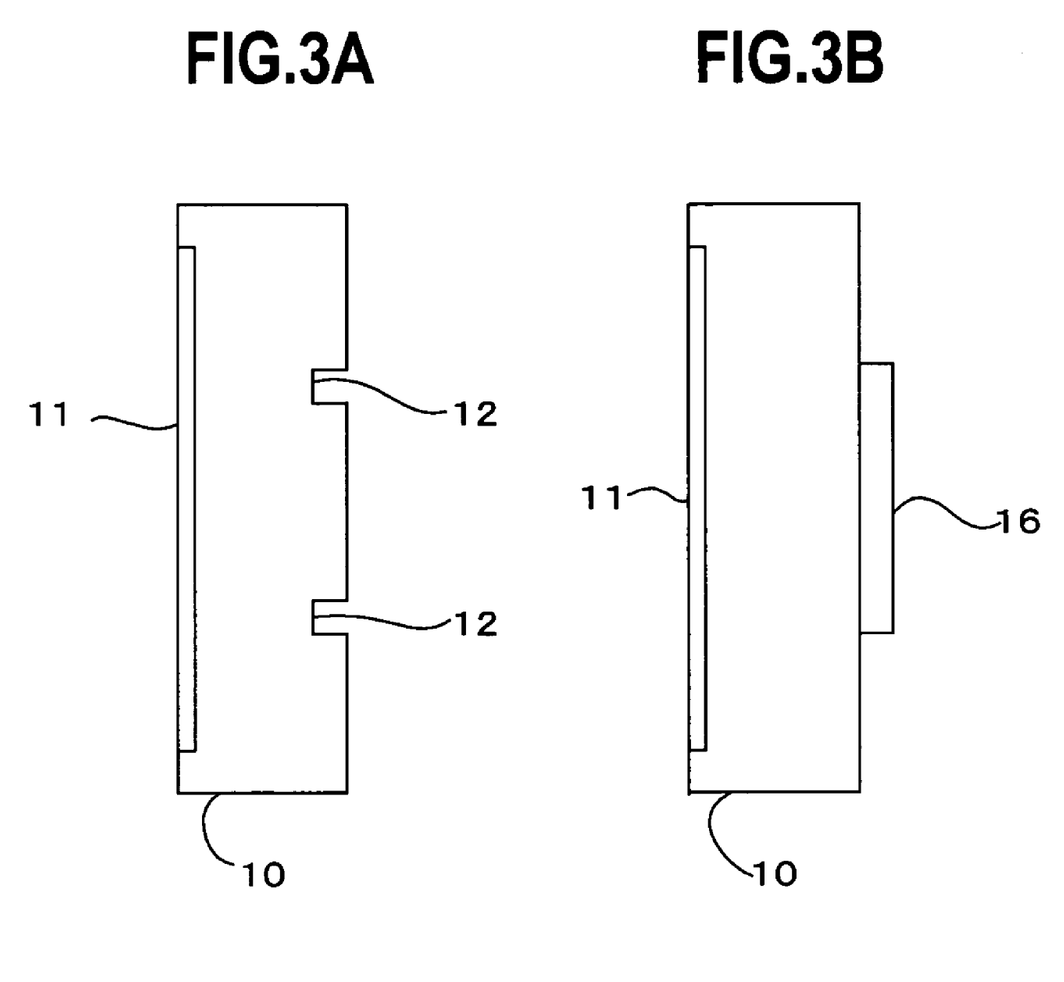
FIGS. 3A and 3B are right-sided views of the display section that show an embodiment of a closed track area that surrounds a fixed pin.

FIG. 3 shows an embodiment of a track that is closed around the fixed pin 13. FIGS. 3A and 3B are a cross-sectional view and right-sided view of the display section 10 respectively. FIG. 3A depicts a groove that is provided with a depressed shape with respect to the display section 10. This corresponds to the guide groove 12 that is used in the description of the first embodiment. The fixed pin 22 that is fixed to the stand 30 is housed in the guide groove 12. Thus, an annular track that is closed is formed in the inner circumferential wall face of the guide groove 12.

The track shown in FIG. 3B depicts a protruding member 16 that is provided protrudingly in the rear face of the display section 10. The outer circumference of the protruding member 16 is close to the fixed pin 22 fixed to the stand 30. Thus, the closed annular track is formed in the outer circumference of the protruding member 16. The protruding member 16 of FIG. 3B is used in the modified example of the first embodiment described subsequently and in the second embodiment.

The display device of this embodiment is able to switch the vertical state in which the long side of the display section 10 is parallel to the upright direction and the horizontal state in which the short side of the display section is parallel to the upright direction by rotating the display section 10 with the fixed pin 13, which has one end fixed to the rear face of the monitor, serving as the axis. The aspect during rotation will now be described.

Figure 4A:
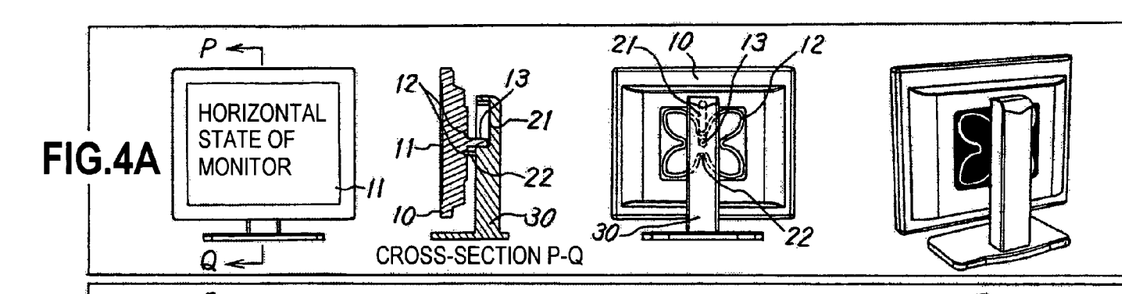
FIG. 4A shows a front view, cross-sectional view, rear view, and rear perspective view when the monitor is horizontal.
Figure 4B:
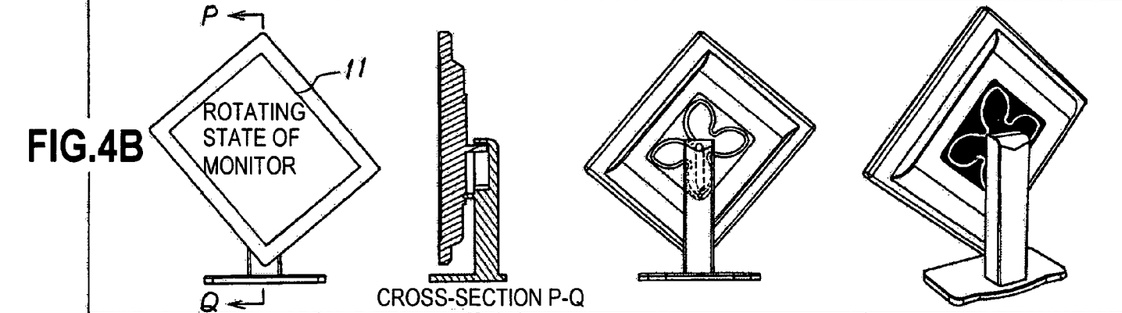
FIG. 4B is a front view, cross-sectional view, rear view, and rear perspective view in the course of monitor rotation.
Figure 4C:
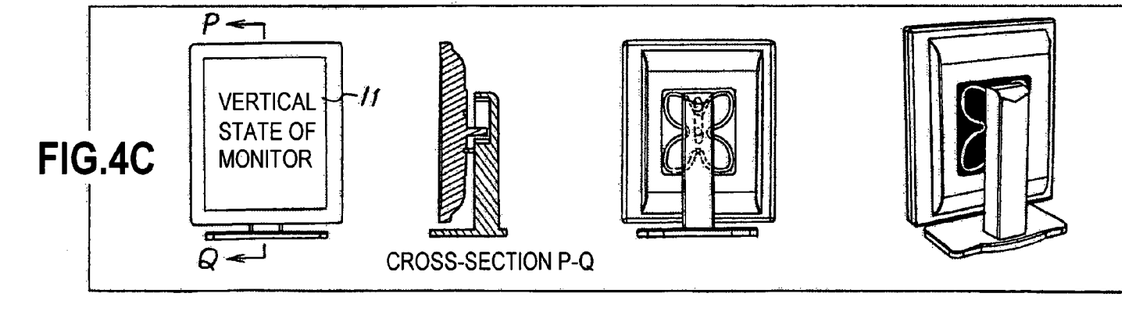
FIG. 4C is a front view, cross-sectional view, rear view, and rear perspective view when the monitor is vertical.

FIG. 4 illustrates an aspect during rotation of the display device of the first embodiment of the present invention; FIG. 4A shows, from the left, a front view, cross-sectional view, rear view, and rear perspective view when the monitor is horizontal; FIG. 1B is a front view, cross-sectional view, rearview, and rear perspective view in the course of monitor rotation; and FIG. 1C is a front view, cross-sectional view, rearview, and rear perspective view when the monitor is vertical. The cross-sectional views of FIGS. 1A to 1C are cross-sectional views of when the display device is cut along the segment PQ in the front view (first from the left) in the drawings. In FIG. 4, the fixed member 14 for preventing the display section 10 from falling is not illustrated.

As shown in FIGS. 4A and 4C, when in the vertical state or horizontal state, the display section 10 is stable on account of the fixed pin 22 that is fixed to the stand 30 being located in the cavity of the guide groove 12 (track). It can also be seen that the height of the monitor 11 when the monitor is in the vertical state and horizontal state is fixed by the depth of the cavity.

FIG. 4B shows an aspect of the display device at the point where the diagonal line of the display section is in the upright direction. So too in this state, because the fixed pin 13 fixed to the display section 10 moves upward along the linear groove 21, the lower edge of the inclined display section 10 does not touch the floor. Thus, the user is able to optimize the height of the screen (monitor) 11 after changing the orientation simply by means of a rotation operation in which the center of the monitor 11 is the center of rotation.

The following description suitably uses enlargements of the required drawings after FIG. 4. FIG. 4, which provides an overview and the individual drawings should be referenced in combination.

Figure 5A:
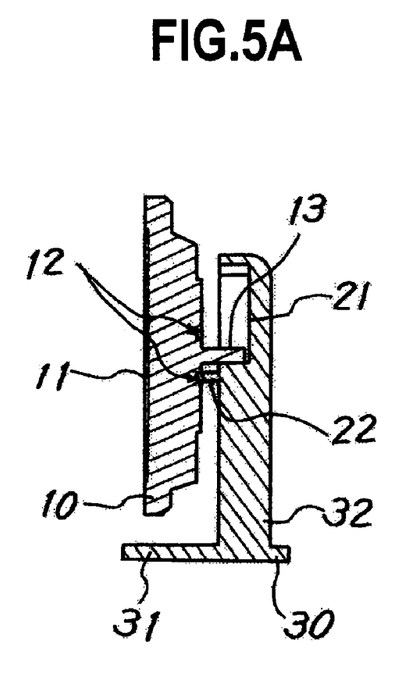
FIG. 5A is an enlarged cross-sectional view when the monitor is horizontal in the first embodiment.
Figure 5B:
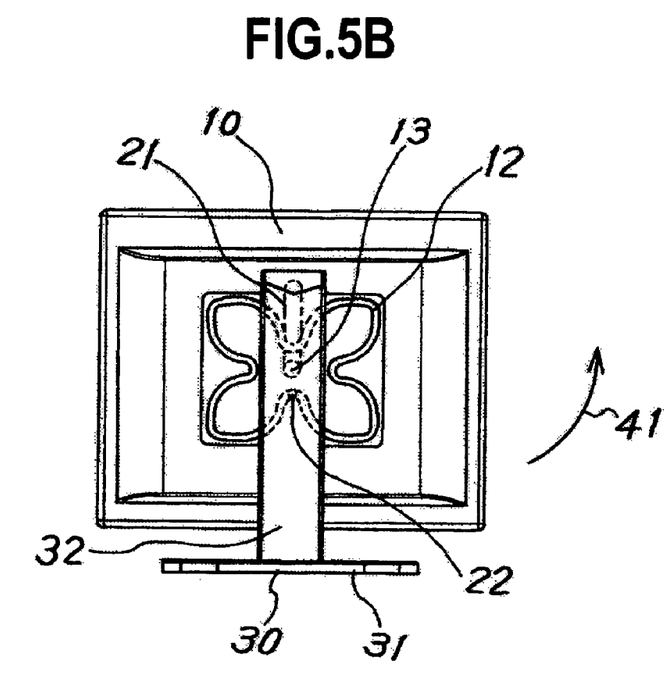
FIG. 5B is enlarged rear view when the monitor is horizontal in the first embodiment.

FIG. 5A is an enlarged cross-sectional view when the monitor is horizontal in the first embodiment; FIG. 5B is enlarged rear view when the monitor is horizontal in the first embodiment. Each of these drawings corresponds to the second and third drawings from the left in FIG. 4A. As shown in FIG. 5A, the guide groove 12 is annular and, therefore, two guide grooves 12 can be seen above and below the fixed pin 13 in the cross-sectional view of FIG. 2A.

When the display section 10 is rotated, the display section 10 is displaced along the guide groove 12 (track) so that the fixed pin 22 fixed to the stand 30 remains within the guide groove 12. This means that, viewed in relative terms, the fixed pin 22 is guided by the guide groove 12 and moves along the guide groove 12. Here, because the fixed pin 22 is fixed to the stand 30, the fixed pin 13 moves vertically along the linear groove 21 that is fixed to the display section 10 in accordance with the distance between the fixed pin 22 and the display section 10.

As shown in FIG. 5B, the track of the guide groove 12 is depressed at four points and comprises cavities. The display section 10 is stable in the horizontal state and the fixed pin 22 is located in one cavity of the guide groove 12 as shown in FIG. 5B. Thus, the cavities at four points are used to stabilize the display device in the vertical or horizontal state.

In FIG. 5A, the fixed pin 13 is located below the linear groove 21. The height of the monitor 11 when the monitor 11 is horizontal is determined by the lower end of the linear groove 21 and, by adjusting the height, the monitor 11 can be positioned at a height that is easy for the user to see when the monitor 11 is in horizontal. Thereafter, when the monitor 11 is rotated in a counterclockwise direction (arrow direction 41) in FIG. 5B, the diagonal of the display section 10 then coincides with the direction of the linear groove 21.

Figure 6A:
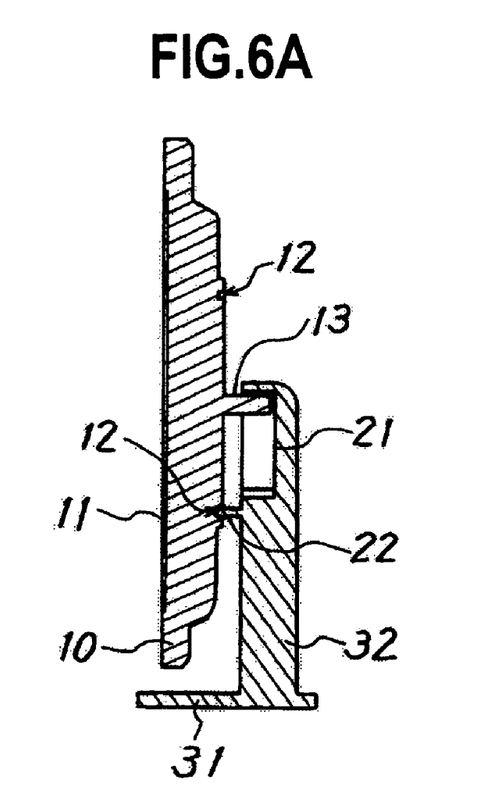
FIG. 6A is an enlarged cross-sectional view when the monitor is rotating in the first embodiment.
Figure 6B:
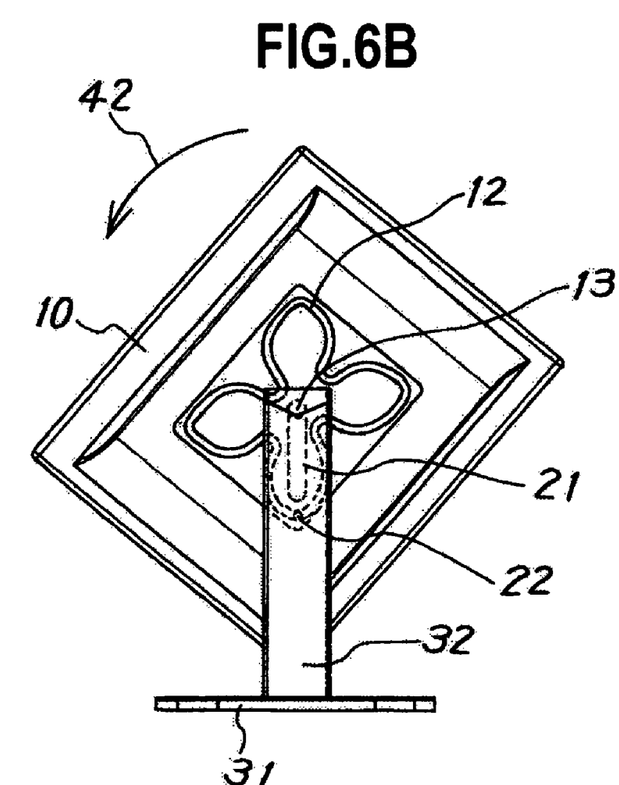
FIG. 6B is enlarged rear view when the monitor is rotating in the first embodiment.

FIG. 6A is an enlargement of the cross-sectional view at this time and FIG. 6B is an enlargement of a rear view. These drawings correspond to the second and third drawings from the left in FIG. 4B. During the rotation from FIG. 5 to FIG. 6, the fixed pin 22 moves relatively from the position of FIG. 5B to the left (in actuality, the guide groove 12 rotates and the fixed pin 22 is fixed).

Further, because the distance between the fixed pin 22 and the center of the display section 10 is long, the fixed pin 13 fixed to the display section 10 correspondingly moves along the linear groove 21. Hence, the display section 10 does not make contact with or interfere with the pedestal 31 or floor (installation face) in the course of rotation. It is clear that there is an adequate gap between the display section 10 and the pedestal 31 in FIG. 6A.

In FIG. 6A, the fixed pin 13 is located at the upper end of the linear groove 21. When the diagonal of the display section 10 coincides with the direction of the linear groove 21, the positions of the fixed pin 22 and the center of the display section 10 are separated to the greatest extent. Hence, in this case, the position of the upper end of the linear groove 21 is determined so that the monitor 11 does not make contact with the pedestal 31 or floor (installation face). Subsequently, when the monitor 11 is rotated further in the counterclockwise direction (arrow direction 42) in FIG. 6B, the monitor 11 is then in the vertical state.

Figure 7A:
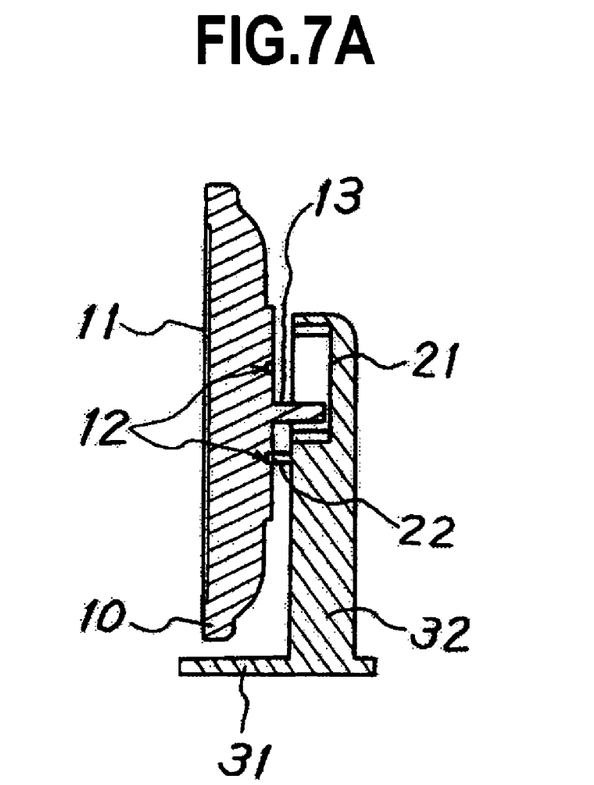
FIG. 7A is an enlarged cross-sectional view when the monitor is vertical in the first embodiment.
Figure 7B:
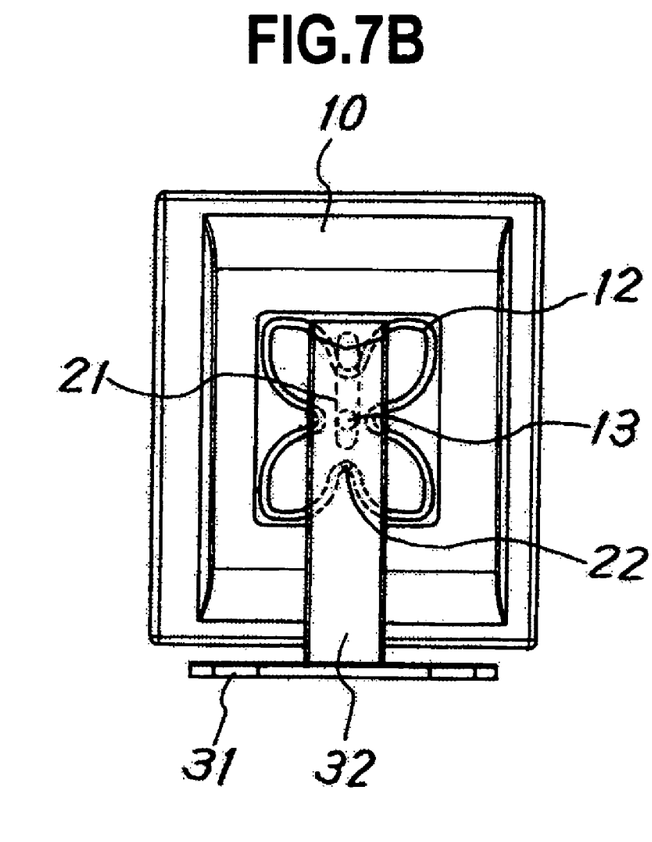
FIG. 7B is enlarged rear view when the monitor is vertical in the first embodiment.

FIG. 7A is an enlarged cross-sectional view when the monitor is vertical in the first embodiment and FIG. 7B is an enlarged rear view when the monitor is horizontal in the first embodiment. These drawings correspond to the second and third drawings from the left in FIG. 4C. In the course of rotation from FIG. 6 to FIG. 7, the fixed pin 22 moves relatively further to the left from the position in FIG. 6B such that the fixed pin 22 is displaced from the cavity in which the fixed pin 22 is located in FIG. 5B and approaches the cavity in a position obtained as a result of a 90-degree clockwise rotation about the center of the display section 10.

Meanwhile, the distance between the fixed pin 22 and the center of the display section 10 is now shorter than in the state of FIG. 6B. Hence, the fixed pin 13 which is fixed to the display section 10 gradually drops from the upper end of the linear groove 21 and the fixed pin 22 stops in a position a short distance above the lower end of the linear groove 21 (See FIG. 7A). The position of the corresponding cavity when the display section 10 is in the vertical state is a short distance apart from the center in comparison with a case where the display section 10 is in the horizontal state. The height of the monitor 11 when the monitor 11 is in the vertical position is determined by the shape of the cavity in the guide groove 12 and, when the monitor 11 is in the vertical state, adjustments are made to position the monitor at a height that facilitates viewing by the user.

Further, in the case of the display device of this embodiment, the orientation of the monitor 11 can also be changed by rotating the monitor 11 clockwise. Further, the monitor 11 can also be changed from a vertical state to a horizontal state.

According to the first embodiment described above, when the orientation of the monitor 11 is changed from the vertical state to the horizontal state, the height of the monitor 11 after the change is adjusted optimally simply by means of a rotation operation of the monitor 11. Thus, the user is able to change the orientation of the monitor 11 and adjust the height thereof by means of a single operation and the labor of the user that accompanies the change in the orientation of the monitor 11 is lightened.

Further, in order to change the orientation of the monitor 11, it is sufficient to rotate the monitor 11 either left or right and damage to parts or the like that occurs as a result of the rotation of the monitor 11 being limited to one direction can be prevented. Further, this constitutes a superior (user-friendly) design for the user.

A modified example of the first embodiment will be described. In the first embodiment, the stand 30 comprises the pedestal 31 that is placed on the installation surface and the rear face plate 32 which extends vertically from the pedestal 31. Here, the rear face plate 32 comprises an attachment member for fixing the rear face plate 32 to a wall surface or the like and an arm that is connected to the attachment member. Attachment members include a clip for fixing the monitor to a desk or shelf and a member for fixing the monitor to a wall or column by threadably mounting the monitor on a wall or post. The arm is of the arm type that is attached to lighting for illuminating an affected part in a hospital or dental clinic or the like, for example and is constituted such that the position or angle thereof can be freely adjusted.

Figures 8A, 8B:
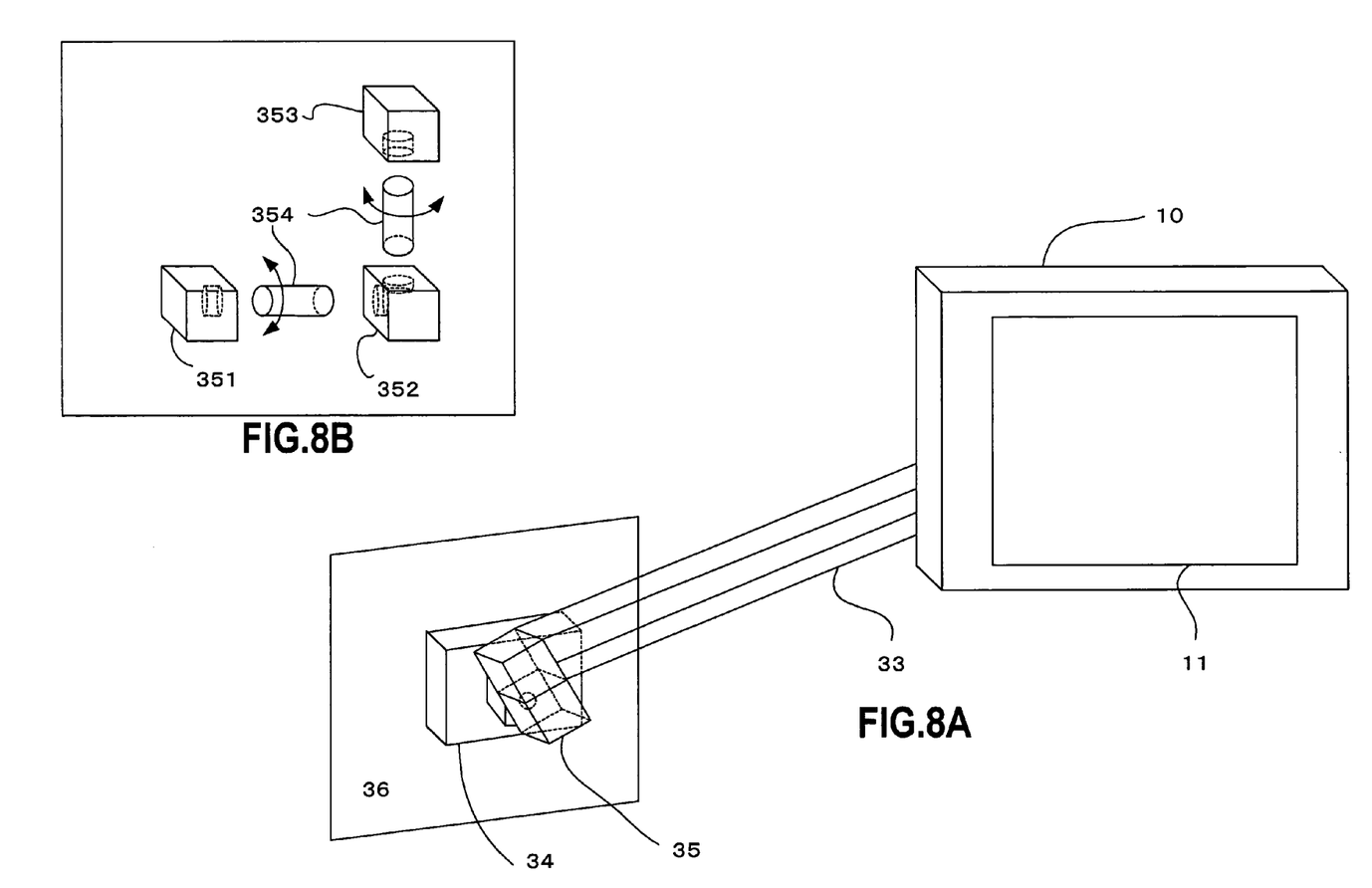
FIG. 8A illustrates a modified example of the first embodiment.
FIG. 8B is an exploded view of a link member that is used in the modified example.

FIG. 8A illustrates a modified example of the first embodiment. The display section 10 is supported by an arm 33 that extends from an attachment member 34 fixed to the wall surface 36. The arm 33 and attachment member 34 are connected via a link member 35.

FIG. 8B is an exploded view of a link member 35. Three cubic link blocks 351, 352, and 353 which constitute the link member 35 are connected by a turning member 354 that allows the blocks to turn with respect to one another. FIG. 8A shows a state where one side of the link block 351 is fixed to the attachment member 34 and a state where one side of the link block 353 is connected to arm 33. Thus, the display section 10 can be disposed in the preferred position by freely changing the angle and position of the arm 33.

An aspect when the display device of the first modified example is rotated will be described next.

Figure 9A:
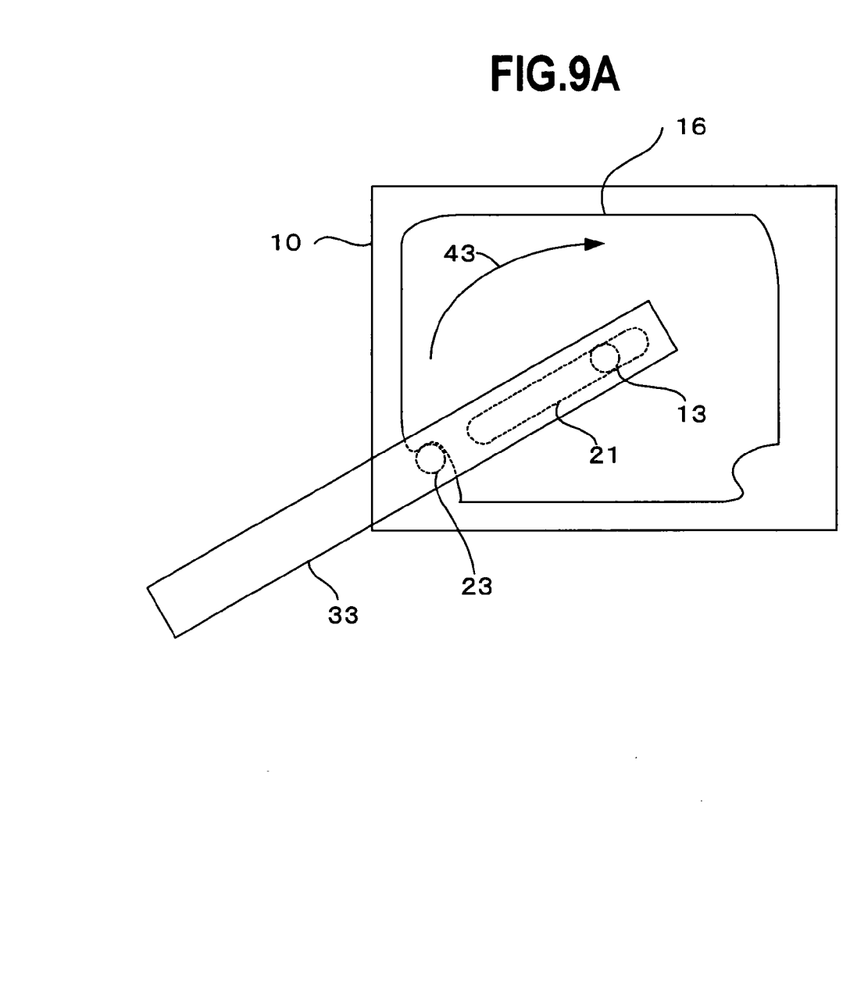
FIG. 9A is a rear view when the monitor is horizontal and FIG. 9B is a rear view when the monitor is vertical.
Figure 9B:
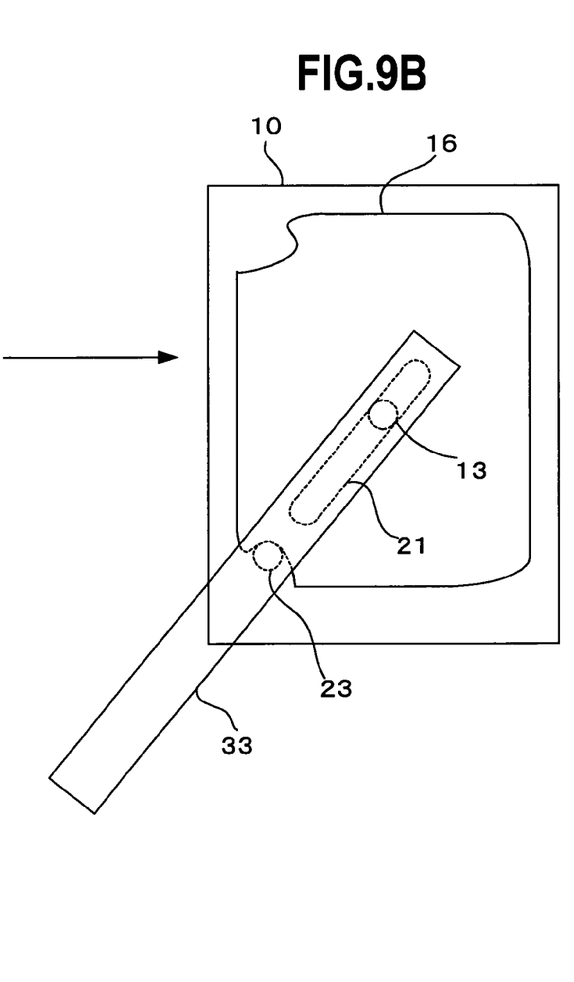

FIG. 9 illustrates the aspect when the display device of the first modified example of the embodiment is rotated. FIG. 9A is a rear view when the monitor is horizontal and FIG. 9B is a rear view when the monitor is vertical. As shown in FIG. 9A, the display device of this modified embodiment is constituted by the display section 10 and the arm 33 that supports the display section 10. In FIG. 9A, although omitted, an attachment member for attachment to a wall surface is connected to the arm 33 and the display device of this modified example can be fixed to the wall surface. Furthermore, although similarly omitted from FIG. 9A, a monitor that displays information is disposed on the surface of the display section 10 and, as per the first embodiment, a fixed member 14 that is used to prevent the display section 10 from falling over is attached to the fixed pin 13.

The fixed pin 13, which is fixed to the display section 10 for changing the orientation of the monitor, is attached at the center of the display section 10 to the rear face of the display section 10. When the display section 10 is rotated along the fixed pin 13 that is fixed to the display section 10, the orientation of the monitor is changed to a vertical or horizontal orientation. The fixed pin 13 fixed to the display section 10 is received on the arm 33 by the linear groove 21.

The linear groove 21 is a groove that extends parallel to the arm 33 along the arm 33 in the modified example. The width of the arm 33 in a direction perpendicular to the direction of the arm 33 is of a size such that the diameter of the fixed pin 13 fixed to the display section 10 is held within the arm 33 and rattle of the fixed pin 13 fixed to the display section 10 is prevented. A turning limit of the fixed pin 13 fixed to the display section 10 that is inserted in the linear groove 21 is provided in the linear groove 21 parallel to the direction of the arm 33 such that there is no movement by the fixed pin 13 fixed to the display section 10 beyond the turning limit in the linear groove 21.

The display device of the modified example is characterized in that a cam 16 is provided on the rear face of the display section 10 and a pulley 23 that contacts the outer circumference of the cam 16 is provided on the arm 33. The cam 16 corresponds to the protruding member 16 shown in FIG. 3B and has a predetermined thickness and the outer circumference of the cam 16 forms an annular track. The pulley 23 contacts the cam 16 and follows the outer circumference of the cam 16. Thus, the pulley 23 supports the display section 10.

When the display section 10 is rotated, the pulley 23 follows the circumference of the cam 16 and the display section 10 moves accordingly. Viewed in relative terms, this means that the pulley 23 is guided by the cam 16 and moves along the annular track formed by the outer circumference of the cam 16. Here, the pulley 23 is fixed to the arm 33 and the fixed pin 13 fixed to the display section 10 moves in a movable range in the linear groove 21 in accordance with the distance between the pulley 23 and the center of the display section 10.

As shown in FIG. 9A, where the annular track formed by the outer circumference of the cam 16 is concerned, the track is depressed on the inside (on the side of the center of the display section 10) at two points to form cavities. This is so that the display section 10 is stable in the horizontal state and the pulley 23 is positioned in one of the cavities as shown in FIG. 9A. Thus, the cavities in two locations are used in order to stabilize the display device in the vertical and horizontal positions.

In FIG. 9A, when the monitor is rotated clockwise (arrow direction 43), the monitor is soon after disposed in the vertical position as shown in FIG. 9B. In the course of the rotation from FIGS. 9A to 9B, the pulley 23 moves relatively to the right from the position in FIG. 9A and enters the other cavity in FIG. 9A. Meanwhile, the fixed pin 13 fixed to the display section 10 moves along the linear groove 21 in accordance with the distance between the pulley 23 and the center of the display section 10.

Further, in the case of the display device of this modified example, the orientation of the monitor can also be changed by rotating the monitor counterclockwise. The orientation can also be changed from a vertical orientation to a horizontal orientation. Moreover, in FIG. 9, in order to simplify the creation of the drawings, cavities are disposed at two points in cam 16. However, a cavity can also be added in point-symmetrical positions to the center of the display section 10 and a cam 16 with cavities in a total of four points can also be used.

Thus, the embodiment of the present invention is possible even when the fixed pin 13 and pulley 23 which are fixed to the display section 10 (in other words, fixed pin 22 in the first embodiment) are not parallel on a vertical when the monitor 11 is horizontal or vertical. In this modified example, although height adjustment of the display device sometimes has very little meaning because free positional adjustment by the arm 33 is possible, adjustment of the screen height when the screen is horizontal or vertical is possible. Thus, in the case of this modified example, the same effects as those of the first embodiment are obtained.

The second embodiment will be described next. In the second embodiment, accessories such as a speaker which is attached to the display device and operation keys for adjusting the screen are disposed on the left and right of the display section when the monitor is in the vertical or horizontal position. Hence, there is then no need for the work involved in removing and re-attaching the accessories before and after the rotation operation.

Figure 10:
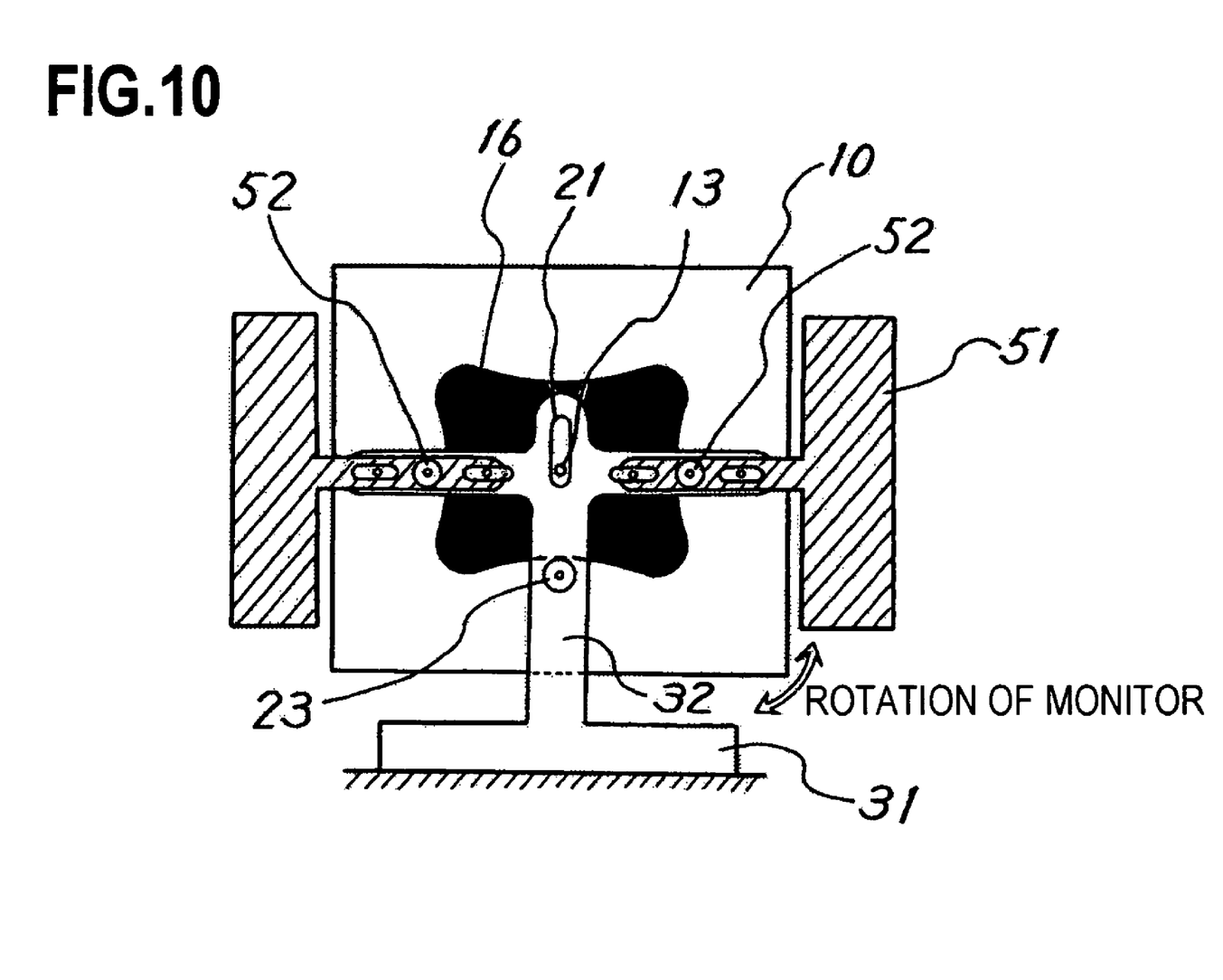
FIG. 10 is a rear view that illustrates a display device of a second embodiment of the present invention.

FIG. 10 is a rear view of a display device of a second embodiment of the present invention. As per the first embodiment, the display device is constituted by a display section 10 that comprises a monitor on which information is displayed (omitted from FIG. 10) and a stand that supports the display section 10.

The stand further comprises the pedestal 31 and the rear face plate 32 which extends perpendicularly to the installation face. A fixed pin 13 that is fixed to the display section 10 for changing the orientation of the monitor is attached at the center of the display section 10 to the rear face of the display section 10.

The fixed pin 13 which is fixed to the display section 10 is received on the stand side by the linear groove 21. As per the first embodiment, the linear groove 21 is a groove that extends in a vertical direction along the rear face plate 32 of the stand which extends perpendicularly with respect to the installation face and the horizontal width of the linear groove 21 is of a size such that the diameter of the fixed pin 13 fixed to the display section 10 is held within the linear groove 21 and sway to the left and right of the fixed pin 13 fixed to the display section 10 is prevented. The linear groove 21 is provided with an upper end and lower end so that, even when the fixed pin 13, which is fixed to the display section 10 that is inserted in the linear groove 21, moves vertically within the linear groove 21, the fixed pin 13 does not fly out of the stand 30. Although omitted from the illustration, a fixed member 14 that is used to prevent the display section 10 from falling is attached to the fixed pin 13 as per the first embodiment.

In the display device of the second embodiment, the cam 16 that forms the annular track is provided on the rear face of the display section 10 and the pulley 23 that contacts the cam 16 is provided on the rear face plate 32 of the stand. The pulley 23 is an abutment member that contacts the cam 16 and supports the display section 10. The cam 16 has a predetermined thickness and the outer circumference thereof is followed by the pulley 23. The outer circumference forms an annular track.

When the display section 10 is rotated, the pulley 23 follows the outer circumference of the cam 16 and the display section 10 is displaced accordingly. This means that, viewed in relative terms, the pulley 23 is guided by the cam 16 and moves along the annular track formed by the outer circumference of the cam 16. Here, because the pulley 23 is fixed to the arm 33, the fixed pin 13 that is fixed to the display section 10 moves along the linear groove 21 in accordance with the distance between the pulley 23 and the center of the display section 10.

In the second embodiment, a speaker 51 is connected to the stand as an accessory. This aspect will now be described using the next figure.

Figure 11:
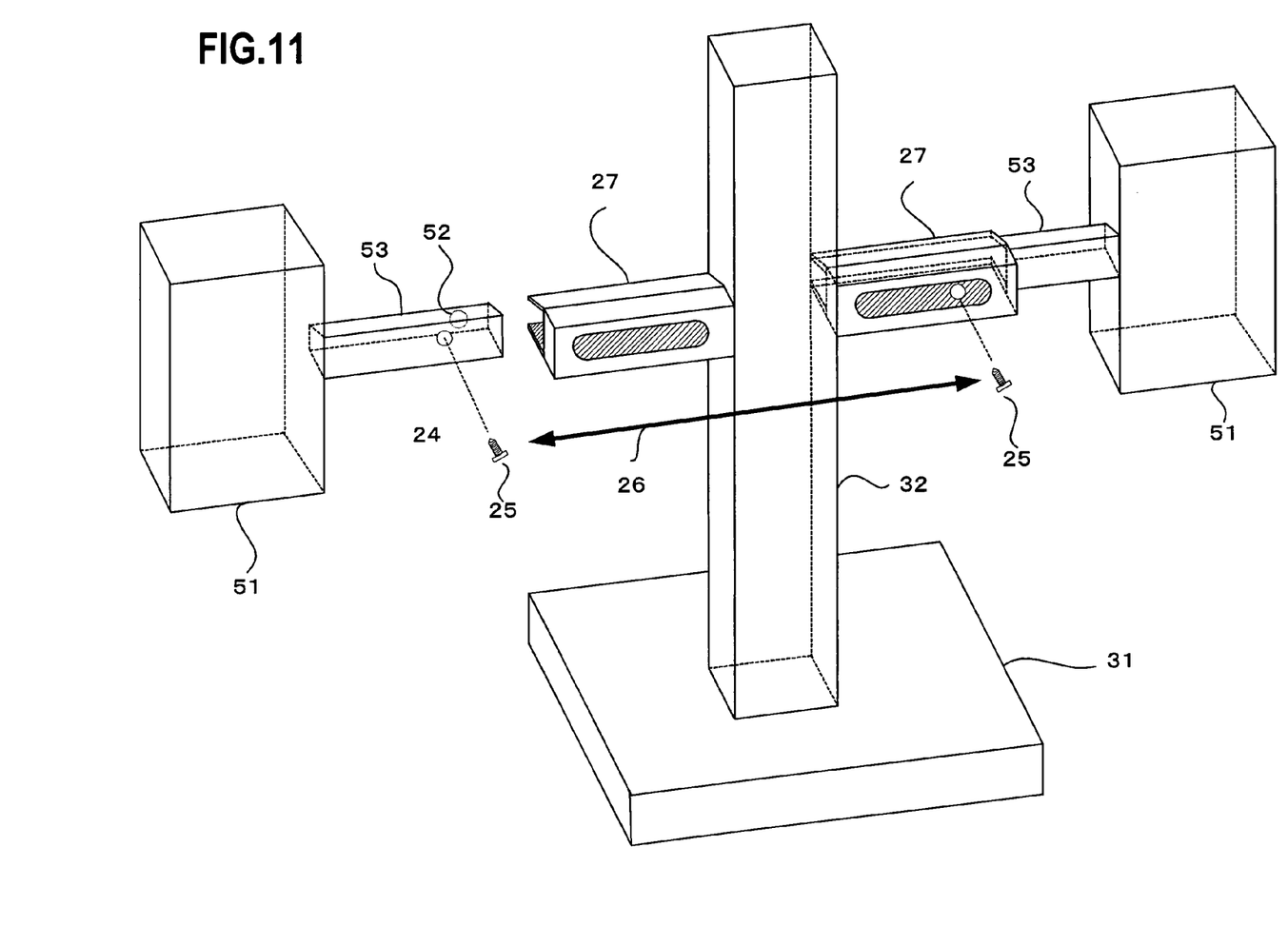
FIG. 11 is a partial exploded view of the display device of the second embodiment.

FIG. 11 is a partially exploded view of the display device of the second embodiment. The stand comprises the pedestal 31, the rear face plate 32 that extends perpendicularly from the pedestal 31, and a stand arm 27 for attaching the speaker. The stand arm 27 is a member that is attached in a horizontal direction from the rear face plate 32 and a portion of the rear face has been drilled. The front part of the stand arm 27 has two plates disposed spaced apart from one another vertically. An insertion hole for the insertion of a connecting member connected to a speaker from the side is also formed.

Speakers 51 are provided as a pair on the left and right sides. A connecting member 53 for insertion in the stand arm 27 is connected to each of the speakers 51. Here, the cross-section of the connecting member 53 is a trapezoid that matches the shape of the insertion hole in the stand arm 27. A pulley 52 is fixed to the surface of the connecting member 53 and a screw hole 24 is provided in the rear face thereof.

Thereafter, the connecting member 53 is inserted from the side into the stand arm 27 and the speakers 51 are subsequently connected to the standby fastening respective screws 25 via the drilled points in the rear face of the stand arm. When the installation of the speakers 51 on the left and right sides is complete, the screws 25 attached to the connecting members 53 of the left and right speakers are connected by means of an elastic member 26 such as a spring or rubber. Thus, the speakers 51 are made to approach one another by means of a righting moment of the elastic member 26.

Figure 12A:
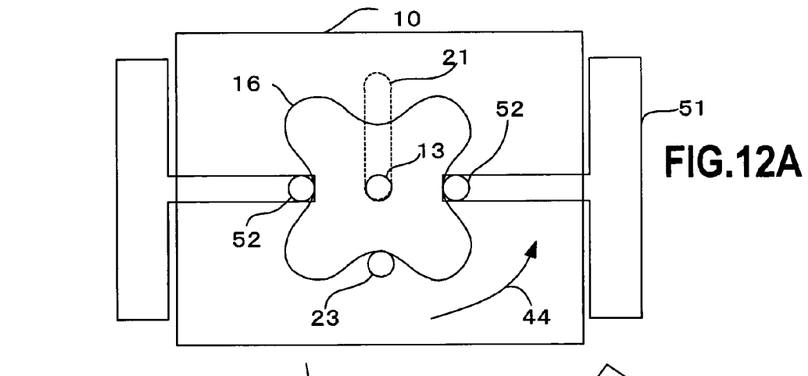
FIG. 12A is a view when the monitor is horizontal.
Figure 12B:
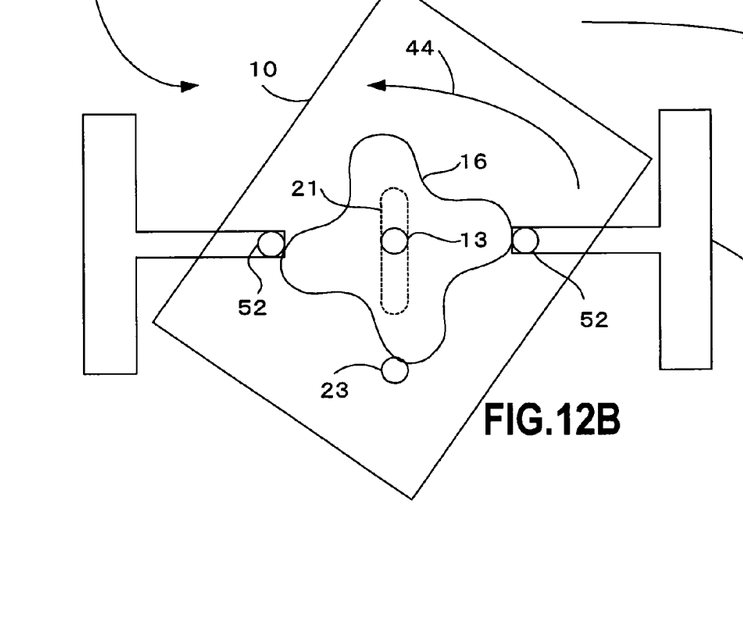
FIG. 12B shows the monitor when the monitor is being rotated.
Figure 12C:
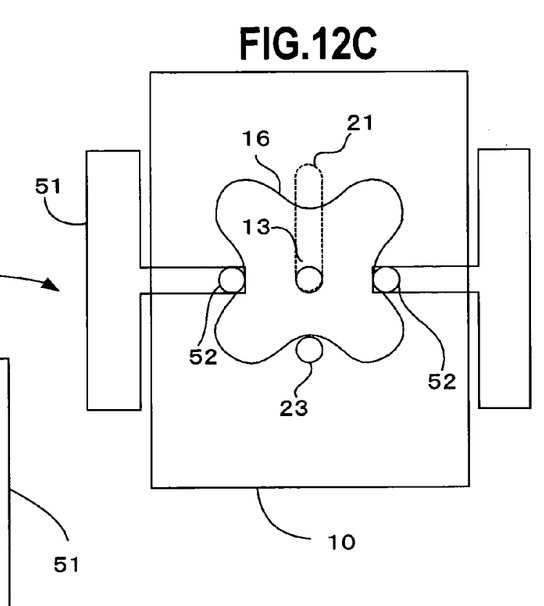
FIG. 12C shows the monitor when the monitor is vertical.

FIG. 12 is a rear view of an aspect when the monitor is rotated in the second embodiment. FIG. 12A shows the monitor in the horizontal position; FIG. 12B shows the monitor during rotation; and FIG. 12C shows the monitor in the vertical position. As shown in FIG. 12A, cam 16 is such that the track is depressed at four points and comprises cavities.

In FIG. 12A, the display section 10 is stable in the horizontal state because the pulley 23 fixed to the stand is positioned in one cavity as shown in FIG. 12A. Thus, the cavities (recesses) at four points are used to stabilize the display device in the vertical or horizontal position.

Thereupon, the pulley 52 for moving the speaker 51 is located in a cavity in a position obtained as a result of rotating the center of the display section 10 clockwise 90 degrees about the center of the display section 10 from the position of the cavity used to stabilize the display section 10 horizontally. The two pulleys 52 are connected by means of an elastic member as illustrated in FIG. 11 and approach one another. Hence, the speakers 51 are stable as a result of the cam 16 being interposed between the pulleys 52 when the pulleys 52 are located in the cavities of FIG. 12A. In FIG. 12A, when the monitor is rotated in the counterclockwise direction (arrow direction 44), the diagonal of the display section 10 soon after coincides with the direction of the linear groove 21.

FIG. 12B is a rear view at this time. In the course of the rotation from FIG. 12A to FIG. 12B, the pulley 23 fixed to the stand moves relatively to the left from the position in FIG. 12A. The fixed pin 13 fixed to the display section 10 slides within the linear groove 21 in accordance with the distance between the pulley 23 and the center of the display section 10.

Thereupon, the pulley 53 is pressed outward by the cam 16 undergoing rotation or the display section 10. In FIG. 12B, the pulley 52 that moves the speaker on the left-hand side as viewed from the rear is pressed outward by the cam 16 and the pulley 52 that moves the right-hand speaker as viewed from the rear is pushed outward by the display section 10 and, as a result, the right-hand pulley 52 is spaced apart from the cam 16. Thereafter, when the monitor is rotated further in a counterclockwise direction (arrow direction 44) in FIG. 12B, the monitor subsequently assumes the vertical position.

FIG. 12C is a rear view when the monitor is in the vertical position of the second embodiment. In the course of the rotation from FIG. 12B to FIG. 12C, the pulley 23 fixed to the stand moves relatively further to the left from the position in FIG. 12B, is displaced from the cavity in which the pulley 23 is located in FIG. 8A and approaches the cavity (recess) in a position obtained as a result of a 90-degree clockwise rotation about the center of the display section 10.

Thereupon, the pulley 53 for moving the speakers 51 draws near to the display section 10 as a result of the shape of the cam 16 and the elastic force of the elastic member that connects the pulley 53. In FIG. 12C, the pulley 52 that moves the left-hand speaker when viewed from the rear moves by following the shape of the cam 16 and is stabilized in the cavity. The pulley 52 that moves the right-hand speaker as viewed from the rear leads to the point where the inclination of the display section 10 as a result of pressing the pulley 52 outward is eliminated and is drawn to the cam 16 by the righting force of the elastic member 26. Thus, the pulley 52 is also stable in the cavity. The cavity in which the pulley 52 is located when the monitor is vertical is the cavity in which the pulley 23 is located in order to stabilize the display section 10 in the horizontal cavity. Likewise, the cavity in which the pulley 52 is located when the monitor is horizontal is the cavity in which the pulley 23 is located in order to stabilize the display section 10 in the horizontal state.

Further, the cam shown in FIG. 12 has a shape obtained by forming cavities in the area of the midpoints of each corner of a square. The monitor height in the vertical and horizontal monitor states is the same height. However, if an adjustment to change the height of the cavities which renders the overall shape of the cam a rectangle is made, the optimum monitor height and position can be implemented in the vertical and horizontal states respectively. Furthermore, so too in the case of the display device of the second embodiment, the orientation of the monitor can also be changed by rotating the monitor clockwise. Furthermore, the monitor orientation can also be changed from a vertical orientation to a horizontal orientation.

In the second embodiment described hereinabove, in addition to the results described in the first embodiment, when speakers and operation keys for adjusting the speaker and screen and so forth are also attached to the display device, the accessories can be disposed in suitable positions on the left and right sides of the display device irrespective of whether the screen is vertical or horizontal. Thus, there is no need for the work involved in the user re-attaching the accessories even though the orientation of the screen is changed and the labor by the user that accompanies the change in screen orientation is lightened.

In the above description, in the first embodiment, the fixed pin was used as a guided member that is guided by a guide groove and the guide groove was used as a guide mechanism that guides the fixed pin. In the modified example and in the second embodiment, a pulley was employed as a guided member that is guided by the cam and the cam is employed as a guide mechanism that guides the pulley. However, this combination may be freely changed. That is, a combination of the fixed pin and the guide groove may also be used in a display device comprising accessories of the type in the second embodiment. The reverse is also true.

In addition, for the annular track, rather than a groove that is formed in the rear face of the display section, a rising rail member exactly like the rail of a monorail obtained by attaching an annular track for which the start and end points of a single line can be connected to the rear face of the display section may also be used. In this case, the embodiment of the present invention can be realized if the pulley that follows the outer circumference of the rail is fixed to the stand. Further, in this case, for example, the rail member is a detachable member. If a deformable material such as a shape memory alloy is used, the user is able to freely change the shape of the track and adjust the optimum screen height by himself.

In addition, although speakers were mentioned by way of an example in the second embodiment as accessories for the display, an I/O device such as a camera, headphones, or an I/O terminal such as a USB terminal could also be used as accessories in place of the speakers. Furthermore, the accessories need not be disposed on the left and right as shown in the example of the speakers but may instead be disposed at the top and bottom of the display.

INDUSTRIAL APPLICABILITY

The present invention can also be applied to information terminals comprising a display section that allows the orientation of the display to be changed to a vertical or horizontal position.

The invention claimed is:

1. A display device, comprising:
 a display section in which a substantially rectangular display screen that displays information is provided at the front thereof; and
 a stand that supports the display section,
 wherein the rear face of the display section comprises an axle portion that protrudes perpendicularly with respect to the display section and one end of which is fixed to the rear face of the display section, and a track that is closed so as to surround the axle portion in the center,
 the stand is provided such that a linear groove in which the axle portion is inserted is provided in the longitudinal direction and such that an abutment member that abuts the track is provided below the linear groove to protrude perpendicularly with respect to the display section; and
 the track has cavities in which the distance from the axle portion is short in comparison with another position on the track, in the vertical and horizontal directions of the display section respectively.

2. The display device according to claim 1, wherein the stand comprises a pedestal that contacts a mounting surface and a rear face plate connected to the pedestal which extends in a perpendicular direction from the pedestal.

3. The display device according to claim 2, further comprising:
 first and second accessories disposed on the left and right of the display section,
 wherein the stand comprises a connecting member one end of which is fixed to the rear face plate and into which the first and second accessories are inserted horizontally,
 the first accessory comprising a first fixed member that protrudes perpendicularly with respect to the display section and abuts the track and the second accessory comprising a second fixed member that protrudes perpendicularly with respect to the display section and abuts the track; and
 the first and second fixed members are linked by an elastic member and abut the track from the outside with the track interposed therebetween.

4. The display device according to claim 3, wherein the abutment member is an axle-like member and the track is formed by a guide groove in which the tip of the axle-like member is inserted.

5. The display device according to claim 3, wherein the track is formed by a protruding member which is provided protrudingly with respect to the stand and covers a predetermined region of the rear face of the display section, centering around the axle portion.

6. The display device according to claim 3, wherein the track is formed by a detachable and deformable member.

7. The display device according to claim 2, wherein the abutment member is an axle-like member and the track is formed by a guide groove in which the tip of the axle-like member is inserted.

8. The display device according to claim 2, wherein the track is formed by a protruding member which is provided protrudingly with respect to the stand and covers a predetermined region of the rear face of the display section, centering around the axle portion.

9. The display device according to claim 2, wherein the track is formed by a detachable and deformable member.

10. The display device according to claim 1, wherein the stand comprises:
 an attachment member for fixing to a wall surface; and
 an arm that is connected to the attachment member and for which the angle of attachment to the attachment member is adjustable.

11. The display device according to claim 10, wherein the abutment member is an axle-like member and the track is formed by a guide groove in which the tip of the axle-like member is inserted.

12. The display device according to claim 10, wherein the track is formed by a protruding member which is provided protrudingly with respect to the stand and covers a predetermined region of the rear face of the display section, centering around the axle portion.

13. The display device according to claim 10, wherein the track is formed by a detachable and deformable member.

14. The display device according to claim 1, wherein the abutment member is an axle-like member and the track is formed by a guide groove in which the tip of the axle-like member is inserted.

15. The display device according to claim 1, wherein the track is formed by a protruding member which is provided protrudingly with respect to the stand and covers a predetermined region of the rear face of the display section, centering around the axle portion.

16. The display device according to claim 15, wherein the abutment member is a pulley and the protruding member is a cam.

17. The display device according to any of claim 1, wherein the track is formed by a detachable and deformable member.

* * * * *